Oct. 29, 1968   I. D. GURWICZ   3,408,538
CONTROL MEANS FOR ELECTRICAL APPARATUS
Filed Aug. 16, 1967
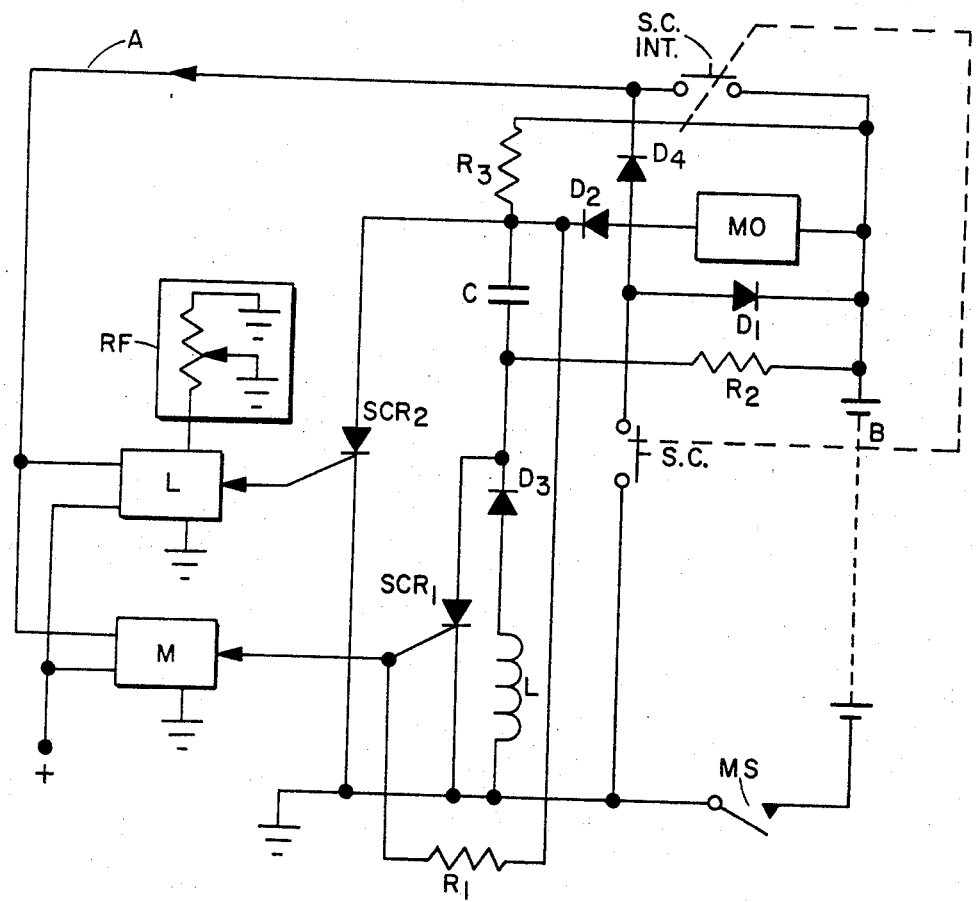
INVENTOR.
ISAAC DAVID GURWICZ

United States Patent Office 3,408,538
Patented Oct. 29, 1968

3,408,538
CONTROL MEANS FOR ELECTRICAL APPARATUS
Isaac David Gurwicz, Durham, England, assignor to Sevcon Engineering Ltd., Gateshead, England
Continuation-in-part of application Ser. No. 404,630, Oct. 19, 1964. This application Aug. 16, 1967, Ser. No. 660,974
Claims priority, application Great Britain, Oct. 23, 1963, 41,731/63
1 Claim. (Cl. 317—11)

ABSTRACT OF THE DISCLOSURE

A control system for a load in which an auxiliary contactor closes before and opens after the main shorting contactor when it is desired to change the supply arrangement to the load and thus prevents arcing at the shorting contactor.

---

This invention is for improvements in or relating to control means for electrical apparatus and is a continuation-in-part of patent application Ser. No. 404,630, filed Oct. 19, 1964, now abandoned.

The invention is concerned with a control system for electrical apparatus comprising a pulse generator circuit adapted to be inserted between the supply and the apparatus to be controlled, and means for adjusting or modulating the mark-space ratio of the pulses and thereby the mean power applied to the motor. For instance, said means may be designed to adjust or modulate the pulse frequency or the pulse width.

In apparatus of the character with which the present invention is concerned it is convenient to provide, in some cases, means whereby the pulse control system can be rendered inoperative and control of the apparatus (e.g. a motor or motors) switched, for example, to an alternative control arrangement. For example, it may be desirable when a motor under the control of the pulse control system has been brought to full speed or load, to switch out the pulse control system and connect the motor or the motors directly to the supply through a contactor.

Switching over from pulse control to a normal or other form of control is conveniently effected by means of a shorting contactor. Such a contactor has, heretofore, been subject to heavy arcing which is objectionable since flame-proofing of the control gear is required. While previous attempts to suppress arcing of such a contactor have been partially successful, as for example the technique described in U.S. Patent No. 2,619,524, these attempts have not succeeded in completely suppressing arcing during the making of the contactor and have not treated the problem of arcing suppression during both the making and breaking of the contactor. An object of the present invention is, therefore, to overcome this problem by eliminating arcing at the shorting contactor during periods of both making and breaking.

According to the present invention means are provided to ensure that the main controlled rectifier of the pulse control system is in the conducting condition before the shorting contactor closes, and remains so until the contacts of the shorting contactor, on breaking, have separated sufficiently to prevent arcing.

The invention will be further described by way of example with reference to the accompanying drawing which is a diagram showing a pulse control system with a short-circuiting contactor S.C. across a main controlled rectifier $SCR_2$, an extinguishing circuit for $SCR_2$ including a second controller rectifier $SCR_1$ and a capacitor C, and an auxiliary contactor S.C. INT connected, as shown by the dotted line, with the shorting contactor S.C.

As shown in the drawing, a load MO is coupled to a source of power B, indicated by a series of batteries.

The power through the load MO, when a shorting contactor S.C. is open and a main switch MS is closed, is controlled and interrupted by the action of a pulse control circuit consisting of a main silicon controlled rectifier $SCR_2$, an extinguishing circuit consisting of a second controlled rectifier $SCR_1$ and a capacitor C, and a variable relaxation oscillator L coupled to $SCR_2$, lead A and a delay circuit M. The lead A feeds a varying potential into the oscillator L and the delay M. In the normal operation (when S.C. is open), assuming $SCR_2$ is non-conducting, the potential of lead A rises to full positive from battery B (through diode $D_4$ and load MO). This starts variable relaxation oscillator L, which, after a delay determined by the variable resistor RF, emits a firing pulse to $SCR_2$ which turns $SCR_2$ on. Due to the resultant collapse of potential across $SCR_2$, lead A can no longer be held positive via diode $D_4$. As the potential on lead A falls it starts fixed delay M which emits a firing pulse to $SCR_1$ which, as explained hereafter, extinguishes $SCR_2$. As a result, the load MO is subject to a pulsed mean current of fixed pulse length and variable pulse frequency.

The extinguishing circuit for $SCR_2$ acts as follows. On closure of the main switch MS to start operation, capacitor C charges, via diode $D_2$, the load MO and through $SCR_1$, which is fired and turned on immediately by the occurrence of a positive potential through $R_1$, the resistance of which is high compared with the output impedance of the delay circuit M so as not to interfere with the normal operation of the delay circuit M. This charges capacitor C fully with +v. on its upper electrode. When $SCR_2$ is later fired and turned on by the variable oscillator L, as explained previously, capacitor C discharges via $SCR_2$, inductor L and rectifier $D_3$ and turns off $SCR_1$ by reverse biasing it. Owing to the inductance of L, the charge on C reverses and remains so with the upper electrode being at −v. because of $D_3$. When the delay circuit M refires $SCR_1$, capacitor C momentarily carries the main current through MO, and reverse biases $SCR_2$ which thus turns off, $SCR_1$ remains conductive by current via $R_2$ until turned off by the next firing of $SCR_2$, and the cycle recommences under control of oscillator L and delay M.

Diode $D_1$ acts as a "free-wheel" shunt across the load M, carrying the inductive current (if any) of M during the off periods of $SCR_2$.

When the oscillator M reaches maximum frequency, it is desired to switch $SCR_2$, and thus the pulse control system, out of circuit. To accomplish this the coupled shorting contactor S.C. and the auxiliary contactor S.C. INT are closed.

The auxiliary contactor S.C. INT is mechanically arranged to close just before the shorting contactor S.C. closes, and to open shortly after S.C. opens. This can be done, for example, by a simple eccentric rotary cam arrangement. Due to the presence of the diode $D_4$, point A is held continuously at the supply potential B when S.C. INT is closed, whether or not the silicon controlled rectifier $SCR_2$ is conducting. This results in the removal of any triggering potential by delay M at the gate of silicon controlled rectifier $SCR_1$ and the continuous generation of firing impulses from the oscillator L. Silicon controlled rectifier $SCR_2$ therefore becomes conducting before the shorting contactor S.C. is closed. When the shorting conducting mode when S.C. is closed and throughout any bouncing of S.C. (due to the presence of $R_3$, which keeps $SCR_2$ conducting). This firing condition on $SCR_2$ remains continuous because of the S.C. INT closure, until just after the shorting contactor S.C. opens.

Resistor $R_2$ ensures that capacitor C is fully charged, in the extinguishing direction, during the period when the shorting contacts S.C. is closed. When the shorting contactor S.C. is opened, the silicon controlled rectifier $SCR_2$ remains in the conducting mode until the opening of the auxiliary contactor S.C. INT. Breaking of this contactor reactivates the "off" delay circuit M, and, since capacitor C is charged, silicon controlled rectifier $SCR_2$ is turned off in the normal manner.

The resistor $R_1$ supplies a firing potential to $SCR_1$ which ensures that it is in the conducting mode when the equipment is initially switched on.

In the circuit shown in the drawing, if the auxiliary contactor S.C. INT and diode $D_4$ arrangement were to be omitted, arcing would occur every time the shorting contactor S.C. were closed and opened even momentarily.

This is apparent since, assuming that the main silicon controlled rectifier $SCR_2$ is initially in the conducting mode, the closing of the shorting contactor S.C. would immediately transfer the load current of $SCR_2$ to the shorting contactor S.C., and would cause $SCR_2$ to extinguish. If the shorting contactor S.C. bounced on making, then the fully supply voltage would appear across the shorting contactor tips as they broke, causing arcing and possibly welding as the shortening contactor remade. Arcing on breaking of the shorting contactor would be due to a similar reason since the main silicon controlled rectifier $SCR_2$ would be in the "off" mode. This objectionable arcing is prevented as described above by ensuring through the auxiliary shorting contactor S.C. INT that the main silicon controlled rectifier $SCR_2$ is in the conducting mode before the contactor closes, and remains so until the shorting contactor tips on breaking have separated sufficiently to prevent arcing.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A control system comprising: a load; means for supplying power to said load, said means including a substantially constant source of power; a plurality of controlled rectifiers coupled to said load and said source of power and adapted to interrupt the power supplied to said load in a preselected manner; oscillator means for controlling the conductive condition of at least one of said controlled rectifiers to interrupt said power supplied; means for short-circuiting said controlled rectifiers for continuously applying said source of power to said load; and interlock means coupled to said source of power and said means for controlling said conductive condition, said interlock means being coupled to said means for short-circuiting said controlled rectifiers and adapted to close before and open after the closing and opening, respectively, of said last recited means, and said oscillator means being responsive to said source of power upon the closing of said interlock means to maintain at least one of said controlled rectifiers in a conductive condition upon the closing of and until the opening of said interlock means.

References Cited
UNITED STATES PATENTS

| | | | |
|---|---|---|---|
| 2,441,789 | 5/1948 | Bivens | 317—11 |
| 2,789,253 | 4/1957 | Vang | 317—11 |
| 3,237,030 | 2/1966 | Coburn | 317—11 X |

LEE T. HIX, *Primary Examiner.*

J. D. TRAMMELL, *Assistant Examiner.*